United States Patent [19]

Martinez

[11] 4,223,961

[45] Sep. 23, 1980

[54] ORIENTATION RING WITH BEARINGS

[75] Inventor: Joachim Martinez, Avallon, France

[73] Assignee: R.K.S., Avallon, France

[21] Appl. No.: 913,219

[22] Filed: Jun. 6, 1978

[51] Int. Cl.² ............................................. F16C 19/49
[52] U.S. Cl. .................................... 308/174; 308/227
[58] Field of Search ............... 308/174, 219, 220, 221, 308/222, 227, 230, 231

[56] References Cited

U.S. PATENT DOCUMENTS

| | | | |
|---|---|---|---|
| 3,258,301 | 6/1966 | Porvatov | 308/227 |
| 3,302,986 | 2/1967 | Grolman et al. | 308/174 |
| 3,393,027 | 7/1968 | Barish | 308/174 |
| 3,804,478 | 4/1974 | Andree | 308/227 |

FOREIGN PATENT DOCUMENTS 548542  9/1955  Italy .......................................... 308/174

Primary Examiner—Charles E. Frankfort
Attorney, Agent, or Firm—Brisebois & Kruger

[57] ABSTRACT

An orientation bearing ring for resisting radial loads, axial loads, and inclined moments. The ring includes first and second races each of unitary construction, opposed thrust faces of the races have roller thrust bearings between them with the axes of the bearings perpendicular to the axis of the ring. An additional row of bearings is disposed in opposed bearing tracks in the respective races, these bearings engaging their tracks at an oblique angle to the axis of the ring.

4 Claims, 1 Drawing Figure

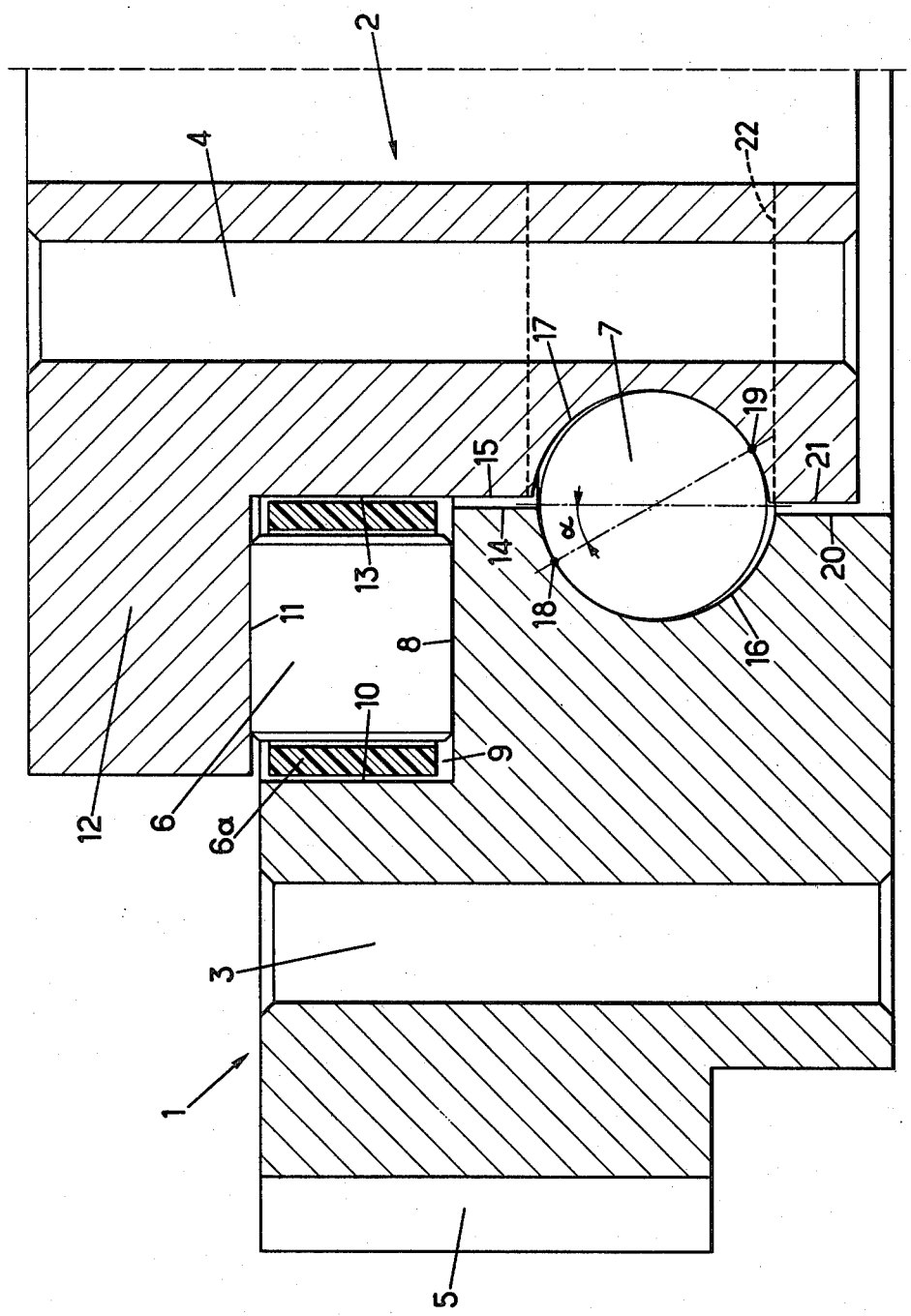

ORIENTATION RING WITH BEARINGS

The present invention pertains to a turning or orientation ring with bearings supporting axial and radial forces as well as inclination moments.

Such orientation rings are used, for example, on cranes, public works machines and generally whenever a member of great diameter is rotatably mounted on another member. In the case for example of a crane, it is not possible to balance the weight of the load and of the boom completely at every instant by a counterweight. The crane is thus submitted to a rocking motion which manifests itself on the orientation ring by a moment of "inclination" trying to make one of the rings or races of the orientation ring rock or tilt in relation to the other. It is necessary then that the orientation rings be able to support such moments in addition to axial and radial forces.

At the present time different types of orientation rings with bearings are known. The oldest rings have two rows of ball bearings making oblique contact. But, it is well known that ball bearings have a limited ability to handle dynamic loads. In order to increase this load capacity orientation rings with rollers have been proposed. The most well-known types are the orientation rings with crossed rollers with two one-piece races, the orientation rings with two rows of rollers in oblique contact at 45° with two one-piece races, as well as the orientation rings with three rows of rollers of which two support solely axial loads, and the third supports the radial loads, but for this third type, at least one of the races must be made in several parts.

It is understood that the two first types are technically more satisfactory, both from the point of view of manufacturing and use. They require however, for the same axial load capacity, rollers of much greater diameter than the rings with three rows of rollers. However, the latter in which at least one of the races must be in several parts are obviously more complex to make and particular precautions are necessary to mitigate the disadvantages of the presence of the joint plane in the multi-piece races; moreover, the rigidity of a multipiece race is not satisfactory.

The present invention has as an object an orientation ring with bearings combining the advantages of the different types of rings enumerated above without having the disadvantages. In other words, the orientation ring conforming to the invention can be manufactured with two one-piece races and has a good load capacity.

The orientation ring with bearings conforming to the invention comprises in combination at least one row of rollers forming a thrust bearing and one row of rolling elements forming a bearing with oblique contact. The rollers of the row forming the thrust bearing, which are preferably cylindrical rollers, have their axes essentially perpendicular to the axis of the orienting ring. Thus, these rollers support axial forces, while the rolling elements forming the bearing with oblique contact support the radial forces as well as certain axial forces due to the inclination moments. The mutual arrangement of the rollers constituting the thrust bearing, and of the rolling elements constituting the bearings with oblique contact, is such that the circle passing through the centers of the lines of contact of the rollers of the thrust bearing with the track for these rollers on one of the rings, and the circle passing through the centers of the areas or lines of contact of the rolling elements making oblique contact with the track for these elements on the same ring, are situated with respect to the axis of the orientation ring, on opposite sides of the corresponding circles on the other ring.

BRIEF DESCRIPTION OF THE DRAWINGS

The attached drawing illustrates an example of a nonlimiting embodiment of an orientation ring conforming to the invention; the single drawing is a partial view in axial section of such an orienting ring.

DETAILED DESCRIPTION OF PREFERRED EMBODIMENT

One can see in the drawing that the orientation ring, intended for example to be mounted between a fixed chassis and a turret or rotatable chassis of a machine, comprises a single exterior race 1 and a single interior race 2 each of which is made in a single piece. The two races 1 and 2 have axial holes 3, 4 for fastening the races 1 and 2 onto the corresponding chassis of the machine, for example by using bolts. The outer race 1 has an exterior set of gear teeth 5.

The two races 1 and 2 are concentric rings and have between them a row of cylindrical rollers 6 and a row of ball bearings 7. The profiles of the two races 1 and 2 are such that the two races can be fit one into the other axially, which enables them each to be manufactured in a single piece, with great rigidity.

Rollers 6 are positioned so that their axes are perpendicular to the axis of rotation of the orientation ring. These rollers 6, in the form of cylindrical rollers, thus form an axial thrust bearing resistant to axial forces applied to the orienting ring. Rollers 6 move on a circular ring roller track 8, constituting in the present case one of the flanks of a recess 9 made in the inner upper corner of the outer race 1. The other flank 10 of this recess is at a right angle in relation to flank 8 and thus constitutes a cylindrical surface.

The second roller track of rollers 6 is constituted by a circular ring surface 11 constituting the lower flank of an annular portion 12 of race 2 which projects radially outwardly above recess 9 of outer race 1. Opposite flank 10 of race 1, the race 2 comprises a flank 13 in the form of a cylindrical surface, the four flanks 8, 10, 11 and 13 together defining in this example an annular space with essentially rectangular profile for circulation of the rollers 6 and possibly for a cage 6a or spacers to maintain the rollers spaced apart. The cylindrical surface 13 of inner race 2 extends downwardly to form a cylindrical surface 15 which is surrounded at a slight distance by an inner cylindrical surface 14 of the outer race 1. On a level with a row of ball bearings 7, outer race 1 has a recess 16 of preferably semicircular profile made in the cylindrical surface 14, preferably with a radius slightly greater than the radius of ball bearings 7. Likewise, inner race 2 comprises, on a level with ball bearings 7, a recess 17, preferably with semi-circular profile made in its cylindrical surface 15 and likewise with a radius slightly greater than the radius of ball bearings 7. As seen in the drawing, the center of the balls 7 is axially offset in the direction of the thrust rollers 6 with respect to the center of curvature of the profile of the first groove 16 of said outer race and in the opposite direction with respect to the center of curvature of the profile of the second groove 17 of said inner race. The two recesses 16, 17 form, with the ball bearing 7, a bearing with oblique contact. In the drawing and in order to better clarify, the clearance has been exaggerated on both sides of the two contact points 18, 19 of ball bearings 7 with tracks 16 and 17, between the surface of the ball bearings and the said roller tracks. In reality, the difference between the radius of the ball bearings 7 and the radius of recesses 16, 17 corresponds to that which is customary for bearings with oblique contact.

Below the row of ball bearings 7, the two races 1 and 2 continue as cylindrical surfaces 20, 21 which have, in this example, diameters preferably slightly greater than the diameters of surfaces 14, 15 respectively.

One can see that rollers 6 support the axial forces while radial forces as well as certain axial forces due to inclination moments are supported by ball bearings 7. When these ball bearings are acted upon by inclination couples tending to make the two races 1 and 2 separate from each other so that the part of race 1 visible in the drawing moves downwardly and the part of race 2 visible in the drawing moves upwardly, the angle of contact of ball bearings 7 with tracks 16, 17 tends of increase, which allows the ball bearings to better support the inclination moment. In this case a sufficient area of contact between the ball bearings 7 and tracks 16, 17, is maintained since the cylindrical surfaces 21 and 14 have similar diameters. The diameter of surface 14 must however be slightly greater than the diameter of surface 21 in order that the two races 1 and 2 can be assembled.

The assembling of the orienting ring is preferably carried out in the following manner: first of all one places the row of rollers 6, with the cage 6a. on the roller track 8 of ring 1. One then fits the inner race 2 into the outer race 1. Finally, one inserts ball bearings 7 and possibly, spacers for them through at least one filling opening provided in one or the of the two races, e.g. a radial fill hole 22 provided in the inner ring 2 and obtured by a plug secured by means of a check pin or the like.

It can be seen that it is completely possible to assemble a prestressed assembly since it requires only choosing the diameter of the rolling elements accordingly.

In addition, other assembly methods than that already described can be used: mounting of the rolling elements constituting the bearing with oblique contact can be by decentering or by a fill slot, mounting of the rollers of the thrust bearing can be by a fill slot, etc...

In addition it is appropriate to observe that it is possible to make numerous modifications and variations of the orienting ring shown and described above. Thus, the toothed periphery which is not obligatory, can likewise be provided on the inner race. Fastening holes 3 and 4 can likewise be blind tapped holes. Watertight seals can be provided both for the row of rollers 6 and for the row of ball bearings 7 between the two races 1 and 2.

Moreover the annular recess 9 can be made radially longer so as to be able to introduce two concentric rows of thrust rollers when axial forces will be very large.

Finally, the cylindrical rollers of the thrust bearing can be replaced by conical rollers and the ball bearings constituting the bearing making oblique contact can be replaced by cylindrical rollers. The nominal angle of contact α, that is to say, under load, of the roller elements of the bearing making oblique contact, in relation to the axis of the alignment ring, is advantageously between 30° and 60° for ball bearings, while it is 45° for roller bearings.

What is claimed is:

1. A rolling bearing orientation ring supporting radial loads and also axial loads in both senses including overtuning moments, comprising an outer race member and an inner race member coaxial with respect to said outer race member, said two race members being rotatable one relative to the other about a common axis, and at least two rows of rolling members between said two race members, comprising at least one row of thrust rollers having their axes substantially perpendicular to said common axis and supporting the axial loads in one sense and a row of rolling members with an oblique contact supporting the radial loads and the axial loads in the other sense, said two race members each being unitary and the outer race member having an inner substantially cylindrical surface provided, at one end, with an annular recess having one flank substantially transverse to said common axis and forming one race of said row of thrust rollers, the inner race member having, facing said inner cylindrical surface and said recess, an outer substantially cylindrical surface whose diameter is slightly smaller than the diameter of said inner cylindrical surface, and provided beyond said end of the outer race member with an annular portion projecting radially outwardly and having one flank substantially transverse to said common axis, facing axially said flank of said recess and forming the other race of said row of thrust rollers, a first groove in said inner cylindrical surface of said outer race member between said flank of said recess and the other end of the outer race member, said first groove forming one race for said row of rolling members with oblique contact, a second groove in said outer cylindrical surface of the inner race member, between said flank of said annular portion and the other end of the inner race member, said second groove forming the other race for said row of rolling members with oblique contact, said inner cylinder surface of said outer race member and said outer cylindrical surface of said inner race member each being two cylindrical surfaces having different diameters and situated respectively on opposite sides of the groove of each race member, the inner cylindrical surface of the outer race member having a smaller diameter between said recess and groove than between said groove and said other end, and the outer cylindrical surface of the inner race member having a greater diameter between said other end and said groove than between said groove and said annular portion, the diameter of said smaller diameter cylindrical surface of the outer race member being slightly greater than the diameter of said greater diameter cylindrical surface of the inner race member, and one at least of said race members being provided with a fill hole for the introduction of the rolling members with oblique contact between said two grooves.

2. A rolling bearing orientation ring supporting radial loads and also axial loads in both senses including overturning moments, comprising an outer race member and an inner race member coaxial with respect to said outer race member, said two race members being rotatable one relative to the other about a common axis, and at least two rows of rolling members between said two race members, comprising at least one row of thrust rollers having their axes substantially perpendicular to said common axis and supporting the axial loads in one sense and a row of balls with an oblique contact supporting the radial loads and the axial loads in the other sense, the said two race members each being unitary and the outer race member having an inner substantially cylindrical surface provided, at one end, with an annular recess having one flank substantially transverse to said common axis and forming one race of said row of thrust rollers, the inner race member having, facing said inner cylindrical surface and said recess, an outer substantially cylindrical surface whose diameter is slightly smaller than the diameter of said inner cylindrical surface, and having beyond said end of the outer race member, an annular portion projecting radially outwardly and presenting a flank substantially transverse to said common axis, facing axially said flank of said recess and forming the other race of said row of thrust rollers, a first groove in said inner cylindrical surface of said outer race member between said flank of said recess and the other end of the outer race member, said first groove forming one race for said row of balls with oblique contact, a second groove in said outer cylindrical surface of the inner race member, between said flank of said annular portion and the other end of the inner race member, said second groove forming the other race for said row of balls with oblique contact, the said grooves having a substantially semi-circular profile with a radius of curvature slightly greater than the radius of the balls, the center of the balls being axially offset in the direction of the thrust rollers with respect to the center of curvature of the profile of the first groove of said outer race and in the opposite direction with respect to the center of curvature of the profile of the second groove of said inner race.

3. A rolling bearing orientation ring according to claim 2, wherein said inner cylindrical surface of said outer race member and said outer cylindrical surface of said inner race member each comprise two cylindrical surfaces having different diameters and situated respectively on opposite sides of said groove of each race member, the inner cylindrical surface of the outer race member having a smaller diameter between said recess and said groove than between said groove and said other end, and the outer cylindrical surface of the inner race member having a greater diameter between said other end and said groove than between said groove and said annular portion, the diameter of said smaller diameter cylindrical surface of the outer race member being slightly greater than the diameter of said greater diameter cylindrical surface of the inner race member, and one at least of said race members being provided with a fill hole for the introduction of the balls with oblique contact between said two grooves.

4. A rolling bearing orientation ring according to claim 2, wherein the balls and rollers comprise balls and rollers of respective diameters for preloading said ring to provide a prestressed assembly.

* * * * *